United States Patent
Kipple et al.

[11] 3,710,437
[45] Jan. 16, 1973

[54] METHOD OF PREPARING INSULATED COIL IN SLOTTED CORE

[75] Inventors: Harry P. Kipple, Penn Hills; Charles E. Price, Pittsburgh, both of Pa.; Adam M. Leader, Mobile, Ala.

[73] Assignee: Westinghouse Electric Corp., Pittsburgh, Pa.

[22] Filed: Aug. 5, 1970

[21] Appl. No.: 61,106

[52] U.S. Cl. ...................29/596, 264/71, 264/272, 29/598
[51] Int. Cl. ...H02k 15/02, H02k 15/10, H02k 15/12
[58] Field of Search ..........29/598, 596; 264/71, 272

[56] References Cited

UNITED STATES PATENTS

| | | | |
|---|---|---|---|
| 3,145,127 | 8/1964 | Baun | 29/596 X |
| 2,464,568 | 3/1949 | Flynn et al. | 264/71 X |
| 2,937,408 | 5/1960 | Limpel | 29/596 UX |
| 3,030,597 | 4/1962 | Piaia, Jr. et al. | 264/272 X |
| 3,436,811 | 4/1969 | Dundas et al. | 29/596 |
| 3,474,527 | 10/1969 | Meyer | 29/596 |

Primary Examiner—Robert L. Spicer, Jr.
Attorney—F. Shapoe and Lee P. Johns

[57] ABSTRACT

A process for applying a coating of insulating, heat hardenable resin to coil turns or windings for use in electrical apparatus, by placing coils of turns or windings in slots of a core of magnetic material, packing the interstices between the turns or windings and the slot walls with a powder of heat hardenable resin while vibrating the apparatus, heating the assembly of the apparatus, coils, and the powder to cure the resin, and applying the powdered resin to melt and the heated end portions of the coils external of additional slots to obtain a cured resinous coating thereon.

9 Claims, 5 Drawing Figures

3,710,437

METHOD OF PREPARING INSULATED COIL IN SLOTTED CORE

BACKGROUND OF THE INVENTION

1. Field of the Invention

This invention relates to electrical insulation and, more particularly, it pertains to a method for applying a synthetic resinous composition as insulation for use in slots in magnetizable cores of dynamo-electric machines or other electrical apparatus.

Description of the Prior Art

Electrical apparatus such as motors and generators, employ insulated coils comprising central core slot portions and end turn portions. The preparation of coils, windings, and conductors for insertion into slots of magnetizable cores by prior methods has involved the time-consuming and costly process of applying insulation tape, wrappers, and cell to the coil portions, such as disclosed in U.S. Pat. No. 3,054,770. The process was particularly involved where it was employed in the repair of coils for motors and generators.

A method that would eliminate or reduce the amount of taping and wrapping required on all types of rewound rotating apparatus would be desirable. In addition to reducing the labor required in the rewinding of rotating apparatus, a reduction of subsequent treatment cycles has been sought. More particularly, in the area of form-wound apparatus, stators, rotors, armatures, direct current fields, and rotating fields, the methods remain the same; i.e., mostly hand-taping, varnish treatment, and approximately 12 -hour baking cycles.

The foregoing problems are of greater moment where repair shops for such apparatus are involved. Repair shops handle apparatus of various sizes and are therefore necessarily based upon non-standardized procedures. For example, repair shops must be prepared to handle rotatable apparatus varying in diameter from 4 inches to 6 feet or more. In such circumstances the methods employed must be adapted to a maximum output at a minimized cost.

SUMMARY OF THE INVENTION

It has been found in accordance with this invention that the foregoing problems may be overcome by winding coils into the slots of a core of a stator, packing the interstices within and between the coils and core walls with powdered fusible resinous material of fine mesh, heating the assembly of the core, coil and resinous material in order to first melt the resinous materials and then flow it into the interstices, and finally cure the resinous material in the slots, applying additional powdered resinous material to the end turn portions of the coils, and, reheating the assembly to flow and cure the resinous material on the coil end turn portions.

DESCRIPTION OF THE PREFERRED EMBODIMENT

Figure 1:
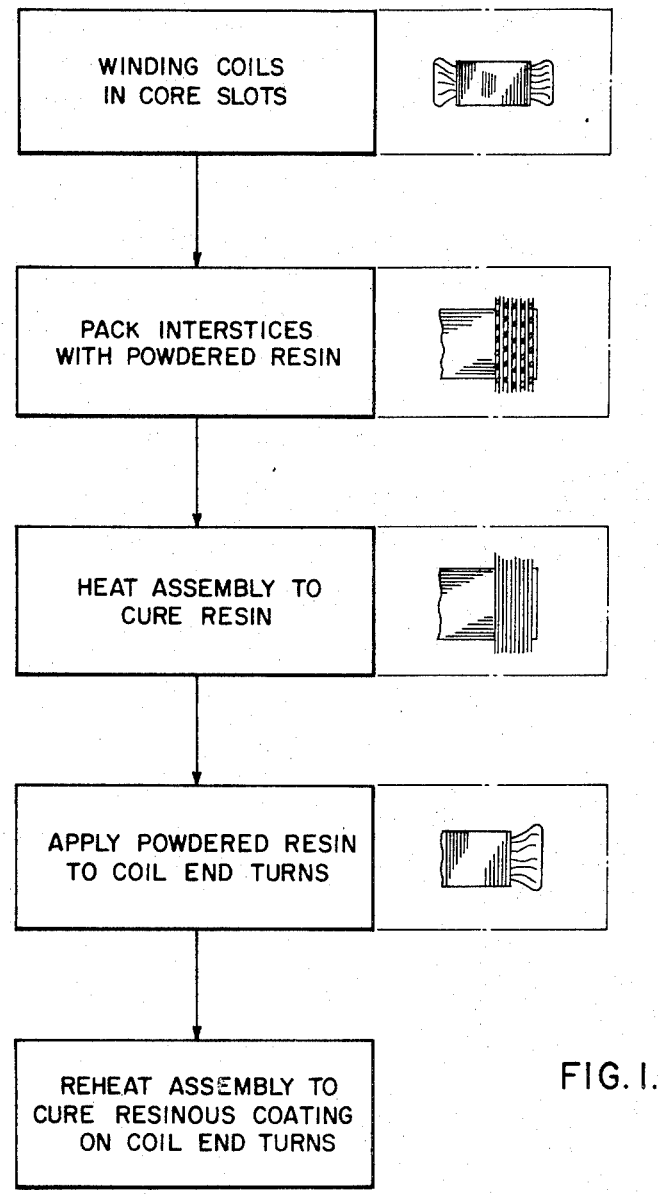
FIG. 1 is a flow chart illustrating the method of the invention.

In accordance with this invention, as shown generally in FIG. 1, the process involves the steps of winding coils in core slots of a stator, packing the interstices between the individual wires or windings and the sides of slots with powdered resinous material, heating the assembly of the stator, windings, and the resinous material to a temperature sufficient to melt it so that it will flow into any remaining voids and to cure the resinous material, applying additional powdered fusible resinous material to the end turns of the coils, and reheating the entire assembly to cure the resinous material on the end turns of the coil.

Figure 2:
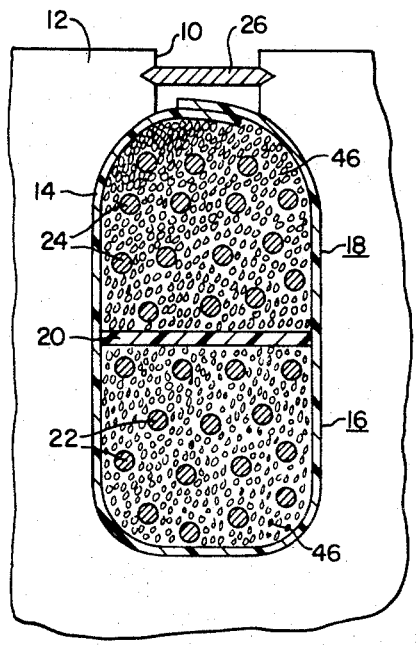
FIG. 2 is a sectional view through a stator slot with unformed coils (mush) and particles of powdered uncured resin therein.
Figure 3:
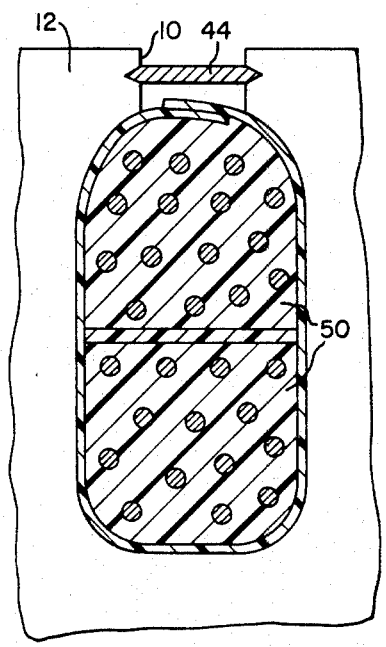
FIG. 3 is a sectional view of the assembly shown in FIG. 4 with the resin in the cured condition.

The process is primarily applicable to unformed or "-mush" coils as shown in FIGS. 2 and 3. The unformed or mush type of coils are inserted in a coil slot 10 of a laminated stator 12. Each slot is preliminarily provided with a liner 14 of sheet-like material composed of insulating material such as resin and mica. A lower coil side 16 is then inserted in place in the lower portion of the slot 10 after which an upper coil side 18 is placed above the lower coil side. An insulating separator 20 is disposed between the upper and lower coil sides 18 and 16. As shown in FIGS. 2 and 3, the lower coil side 16 is composed of a plurality of individual wires or windings 22 and the upper coil side 18 is composed of a similar number of individual wires or windings 24. All of the wires 22 and 24 are provided with a resinous enamel coating to provide turn-to-turn insulation, such enamel coated wires are well-known in the art and are readily available. A wedge 26 is provided at the upper end of the slot to retain the coil sides tightly in place.

Figure 4:
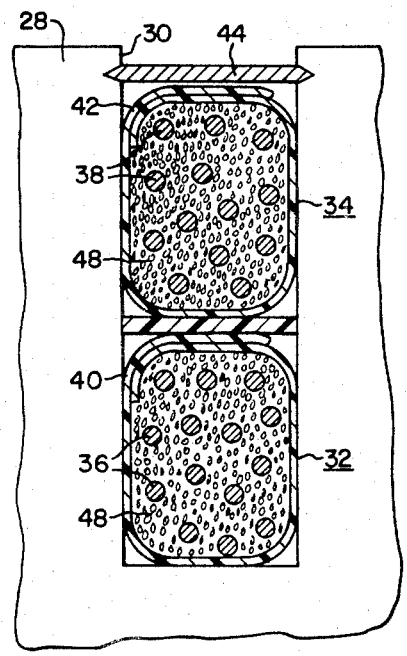
FIG. 4 is a sectional view through a stator slot with unformed coils enclosed in a wrapper and in particles of powdered uncured resin.

As shown in FIG. 4, a stator core 28 may be provided with a slot 30 having straight side walls, instead of the shape of the slot 10 (FIG. 2). The slot 30 enables the insertion of preformed lower and upper coil sides 32 and 34 containing wires 36 and 38 which are first enclosed in separate wrappers or slot liners 40 and 42, respectively. The wrappers 40 and 42 are wrapped around their corresponding coil sides four or five times before the sides are inserted into the slot 30. The wrappers 40 and 42 are composed of mica particles or flakes bonded together with a resinous material such as epoxy resin. Preferably the resinous material is a fusible or B-staged resin. A wedge 44 is inserted at outer end of the slot.

After the core slots 10 and 30 are assembled with their coils as shown in FIGS. 2 and 4, the assembly is ready for the introduction of particles 46 (FIG. 2) and 48 (FIG. 4) of powdered fusible resinous material. The particles have a mesh size of 100 mesh and coarser such that the particle diameters range from about 150 to 830 microns. The particles 46 and 48 are packed in place preferably by turning the stator on one side so that the axis thereof is vertical and then pouring the particles of resinous material into the slots while vibrating the stator. In that manner the particles gradually move downwardly in the interstices to the lowermost end of the slots between the several windings 22, 24, 36 and 38 where the particles under vibration compact and build up until all interstices between the windings as well as between the windings and the liner or wrapping are filled.

The resinous material is composed of a powder of either a fusible resinous material or a B-staged resin and may be a thermoplastic resin or thermosettable resin which has been only partially cured or advanced to a B-stage so that the resin particles will fuse, flow together, and form a bond. The fusible thermosettable resin may, of course, be ultimately cured to a fully cured infusible state. The thermoplastic type of resins may be employed if they do not soften at the operating temperature of the apparatus. The thermoplastic resins are simply cooled after they melt. A preferred composition of the thermosettable type resin is a homogeneous blend of two solid DGEBA epoxy resins, a pigment, an amine curing agent, and a silica filler.

After the assembly of the windings in the stator, the slots are completely filled with particles of powdered resin, and the entire assembly of the stator core filled with the powdered resin is heated to melt and then cure the resin. The temperature to which the assembly is heated is dependent upon the type of resin constituting the powdered resin or resin blend. For most purposes, however, a stator is heated to a temperature range of from about 150° to 350° F. In some instances a temperature of 400° F may be desirable where the resin has a high melting or curing temperature. Where the stator is heated to about 350° F., which is suitable for most resins, the stator is held at that temperature for a sufficient time to permit the molten resin to flow into all remaining fine interstices and voids in the coil and between the coil and the core and to enable the resin to be completely cured.

Figure 5:
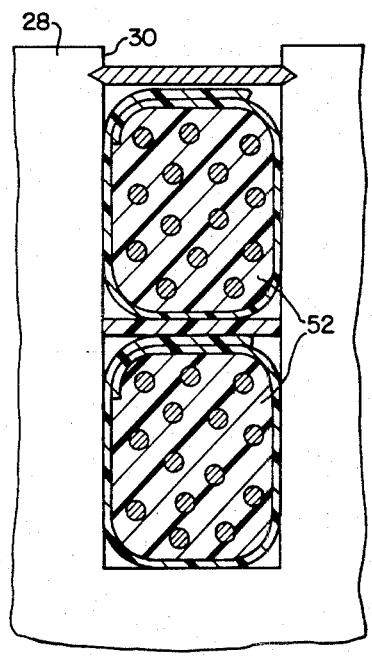
FIG. 5 is a sectional view of the assembly shown in FIG. 3 with the resin in the cured condition.

During melting and curing the separate particles coalesce and fuse together to form a single solid resinous body 50 (FIG. 3) or 52 (FIG. 5). The resinous bodies 50 and 52 substantially fill all of the core volume which is not otherwise occupied by the windings, liners and/or wrappers. Similarly, any fusible resin in the wrappers 40 and 42 fuses and flows to mix with the fused particles to form part of the solid resinous bodies 50 and 52. As a result, each winding is encased separately within the body 50 or 52 of the solid resinous material where it is held firmly in place and thereby prevents the windings from a vibrating movement which, during the life of the stator, will cause rubbing abrasions between adjacent windings and the core walls, resulting in grounding of the winding and shorting of the circuit. Moreover, the solid resinous material in the slot assures better heat transfer from the windings to the core.

After the resinous material is cured, the stator is immediately removed from the heating oven and, while the end turns of the coils are still hot, particles of powdered fusible resin, for example the heretofore described DGEBA epoxy resin blend, are applied by spraying, pouring, immersion in a fluidized bed or otherwise, to the end turns until they are completely covered with a resinous coating which bonds with the resin previously applied in the slots. During the application of the powdered resin to the end turns, there may have been a sufficient loss of heat to prevent the resinous material applied to the end turns from flowing properly. For that reason it may become necessary to reheat the assembly in order to flow and cure the resinous coating material on the end turns of the coil.

Thereafter additional applications of resinous material may be applied to the previously coated end turns, after which the assembly is again reheated, if necessary, to a temperature, such as 350° to 400° F. to cure the freshly applied layers of resinous material.

The foregoing procedure may be adapted to installing coils in stators of electrical equipment of varying sizes. The process is particularly adaptable for use with stators having a size of from about 4 inches to 6 feet in diameter and involving electrical equipment handling upwards of 3,000 volts.

It is understood that the above specification and drawings are merely exemplary and not in limitation of the invention.

What is claimed is:

1. In the method of providing an insulating winding in a slotted magnetizable core of a dynamo-electric machine, the steps comprising:
    placing a coil having a plurality of turns into a slot of the core; introducing into the interstices of the coil and the interstices between the turns and the slot walls while the coil turns and slot are vertical and they are at a temperature below the melting point of the resinous material a dry powder of fusible resinous material; vibrating the core and coil so as to cause the powder to move downwardly to compact into and fill the interstices and thereafter heating the assembly of core, coil, and powder to a temperature sufficient to fuse the resinous powder and cause it to flow into the interstices and cover the windings and coat the slot walls, and to advance the resinous material to a fully cured state; whereby cured solid resinous material is disposed between and around the turns of the coil and between the turns and the walls of the slot.

2. The method of claim 1 wherein the coil includes end portions external of the core slot, and further applying a coating of fusible polymerizable resinous material to the coil end portions while the coil is at the temperature sufficient to melt and polymerize the material in place.

3. The method of claim 1 in which the assembly of the core and coil is disposed with the slots being vertical and the assembly is vibrated during the introduction of the dry powder so that a substantially solid packing of the interstices with powdered resinous material takes place.

4. The method of claim 1 in which the assembly of the core and coil, with the applied powdered resinous material is heated to a temperature above the fusion point of the powder and below the decomposition temperature of the powder.

5. The method of claim 4 wherein the temperature is from about 150° to 400° F.

6. The method of claim 2 wherein a plurality of coatings of powdered resin are applied to the coil end portions and heated to melt the resin after each application.

7. The method of claim 1 wherein the powder of resinous material is of a particle size of from about 150 to 830 microns in diameter.

8. In a method of providing an insulated winding in a slotted magnetizable core of dynamo-electric machines, the steps comprising: enclosing at least the slot portion of a coil having a plurality of turns in a wrapper composed of mica particles bonded together with a fusible resinous material; placing the enclosed coil into a slot of the core; introducing by vibratory action into the interstices between the turns, wrapper and slot walls a dry powder of fusible resinous material; thereafter heating the assembly of core, coil, wrapper and powder to a temperature sufficient to fuse and melt the resinous material in the wrapper and the powder together and to advance the resinous materials to a fully cured state; and then applying powdered resin to the end turns to the coil while heated above the fusion temperature of the resin to provide a resin coating to the ends.

9. In the method of providing a resin impregnated electrical coil comprising a plurality of turns of a winding in the slot of a magnetic core, the steps comprising assembling the electrical coil in the slot of the magnetic core, disposing the assembled coil and the magnetic core so that the slot is generally vertical, applying to the upper end of the coil a dry powdered thermoplastic resin having a melting point above the maximum operating temperatures the coil and core will be subjected to when in service, vibrating the assembled core and coil so that the powdered resin flows downwardly into the interstices between the turns of the winding and the spaces between the coil and core slot walls, and the powdered resin fills and packs the interstices and spaces, thereafter heating the assembled core and coil with the powdered resin filling to a temperature above the melting temperature of the powdered resin so that the resin melts and flows into all the interstices of the slot portion of the coil and the spaces, cooling the core and coil assembly to solidify the thermoplastic resin whereby to provide a solidly bonded coil and core, and finally applying a resin coating to the end turns of the coil to fully insulate the coil.

* * * * *